United States Patent [19]

Reschovsky et al.

[11] 4,225,851
[45] Sep. 30, 1980

[54] SELF-CALIBRATED SUBCARRIER TELEMETRY SYSTEM

[75] Inventors: John M. Reschovsky, Schenectady; Walter Whipple, III, Amsterdam, both of N.Y.

[73] Assignee: General Electric Company, Schenectady, N.Y.

[21] Appl. No.: 23,022

[22] Filed: Mar. 22, 1979

[51] Int. Cl.³ .................................................. G01D 7/12
[52] U.S. Cl. ................................ 340/177 CA; 340/209
[58] Field of Search .......................... 340/209, 177 CA

[56] References Cited

PUBLICATIONS

Alan Adler, "Telemetry for Turbomachinery", Mar. 1979, *Mechanical Engineering*, pp. 30–35.
V. Donato, S. P. Davis, "Radio Telemetry—Turbines", Apr. 1973, *Sound and Vibration*, pp. 28–34.

*Primary Examiner*—Harold I. Pitts
*Attorney, Agent, or Firm*—John F. Ahern; Ormand R. Austin

[57] ABSTRACT

A self-calibrating subcarrier telemetry system for measuring strain on rotating members of a turbine under operating conditions. A rotor mounted portion of the system includes a strain gage transducer bridge excited by a subcarrier alternating current derived from an induced power source. The transducer bridge produces an output signal, amplitude modulated by the strain signal whereby the modulation shifts the strain signal into a higher frequency portion of the spectrum away from low-frequency noise related to the rotational speed of the turbine. A calibration signal is introduced by automatically unbalancing the bridge transducer periodically at a rate related to the subcarrier frequency. The strain signal is recovered in a stationary data reception portion of the system by a synchronous detector. A reference calibration signal is provided against which receiver gain is adjusted to achieve a null, leaving only the calibrated strain signal and achieving indpendence of variations in system gain. Nulling against the unipolar calibration reference further provides a means to distinguish tensile and compressive strain.

8 Claims, 4 Drawing Figures

SELF-CALIBRATED SUBCARRIER TELEMETRY SYSTEM

BACKGROUND OF THE INVENTION

This invention relates to a telemetry system for measuring strain on structural members of rotating machinery during operation, and more particularly to a subcarrier telemetry system that is self-calibrating and in which low-frequency dynamic strain signals are separated from background noise associated with rotational speed of the machine.

Strain resulting from operational stress on a machine is ordinarily measurable by strain gaging techniques well known in the art. However, with machines having rotating members such as, for example, a turbine rotor, transmission of the measured information presents a special problem in establishing a reliable transfer link between the rotating objects of the measurement and the stationary data collection point. Slip rings to establish electrical contact between rotating and stationary members, and through which information signals might flow, are of little use in the operating environment of a high-speed turbine. The measured information, in the form of an electrical signal, is virtually inseparable from other, spurious noise signals introduced as the contact brush bears upon its slip ring. In many instances, too, the use of slip rings would necessitate an unacceptable modification to the turbine itself.

Radio-telemetry is presently the most practical means available for gathering information on the strain produced in turbine rotors during operation, and it has been used for that purpose since the late 1950's. The obvious advantage of telemetry is that a wireless link is provided between rotating sensing devices and stationary instrumentation. A discussion of radio-telemetry for the measurement of strain on turbine rotors is available in *Sound and Vibration*, April 1973, by V. Donato and S. P. Davis under the title "Radio Telemetry for Strain Measurements in Turbines".

In spite of their history of utility, however, telemetry systems continue to suffer certain severe limitations. As applied in turbine measurements, there is an unavoidable susceptibility to magnetically induced noise signals which are synchronous with the speed of turbine operation. This noise phenomenon is a result of the strain gages, lead wires, and transmitters being rotated at high velocities through regions where small residual magnetic fields cannot be eliminated. Repeated identically each revolution, the noise signals are indistinguishable from vibrational strains produced by a "per rev" stimulus.

Another major limitation of telemetry systems is the poor accuracy of the measurement information gathered. This results to a large extent from variations in overall system sensitivity. For example, variations in the gain of the telemetry transmitter during operation is one significant factor limiting the accuracy attainable. The apparent magnitude of the strain will be observed to go up or down depending on the instantaneous gain of the transmitter. Temperature plays a part in this, being known to affect both transmitter gain and other system components so that an uncertain portion of the apparent gage response may be due to temperature and not truly due to strain.

Accordingly, it is an object of the present invention to provide an improved radio-telemetry system in which the desired, measured information is separated from undesired noise signals to obtain more reliable information.

An additional object of the invention is to achieve more accurate measurements by radio-telemetry, providing means for self-calibration to eliminate the effects of extraneous factors which may affect overall system sensitivity and gain.

SUMMARY OF THE INVENTION

This invention is directed to a self-calibrating telemetry system for measuring strain on rotating members of a turbine or generator under operating conditions. In a preferred embodiment, a rotor mounted portion of the system includes a bridge circuit whose active arm is a strain gage suitably bonded to the rotor member to be monitored. The bridge is excited by a subcarrier alternating current derived from an induced RF power signal and reduced in frequency therefrom by a frequency divider network. The output produced by the bridge circuit in response to strain, is a signal at the subcarrier frequency, amplitude modulated by the imposed strain signal. The modulation process shifts the strain signal into a higher frequency portion of the spectrum away from low-frequency noise related to the rotational speed of the turbine or generator and induced by residual magnetism. A calibration signal, simulating a known, fixed magnitude of strain is introduced by automatically unbalancing the bridge circuit periodically at a rate related to the subcarrier frequency. The bridge output, including measured strain information and the periodic calibration signal, is fed to an FM transmitter to be sent by high-frequency carrier signal to the stationary portion of the system.

The FM carrier signal is demodulated in an FM receiver to yield the amplitude modulated bridge signal. A synchronous detector having a reference signal input identical in frequency and phase to the subcarrier provides amplitude demodulation for recovery of the strain and calibration signals. The reference signal is obtained from the induced RF power source through frequency divider and phase adjusting networks. The recovered strain and calibration signals are applied to one input of a summing network.

An inverted reference calibration pulse, identical in phase, duty cycle, and frequency to the transmitted calibration signal (representing a known, fixed value of strain) is generated by frequency division of the induced RF power signal and a pulse generator network. This signal is provided to a second input of the summing network. Gain of the receiver circuit is adjusted to produce a null between the transmitted calibration signal and the reference calibration signal. The output of the summing network is filtered to remove higher frequencies, leaving a noise-free signal accurately representative of strain on the rotor element being monitored. By observing the output signal polarity, compressive strain can be distinguished from tensile strain.

BRIEF DESCRIPTION OF THE DRAWINGS

While the specification concludes with claims particularly pointing out and distinctly claiming the subject matter regarded as the invention, the invention will be better understood from the following description taken in connection with the accompanying drawings in which:

DESCRIPTION OF THE INVENTION

Figure 1:
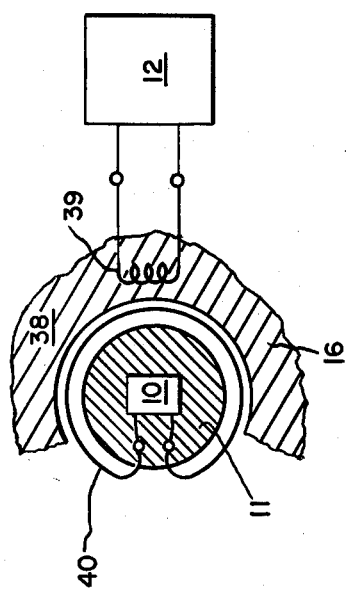
FIG. 1 illustrates division of a preferred telemetry system according to the present invention into a transducer-data transmission portion mounted on a rotating member and a stationary data reception-readout portion.

FIG. 1 shows a preferred embodiment of the invention illustrating division of the telemetry system into a transducer-data transmission portion 10 mounted on a turbine rotor 11, rotatable therewith, and a stationary data reception-readout portion 12 mounted in convenient proximity to the turbine shell 16. The two portions 10 and 12 are linked by a rotary transformer 38 having primary winding 39 and secondary winding 40.

Figure 2:
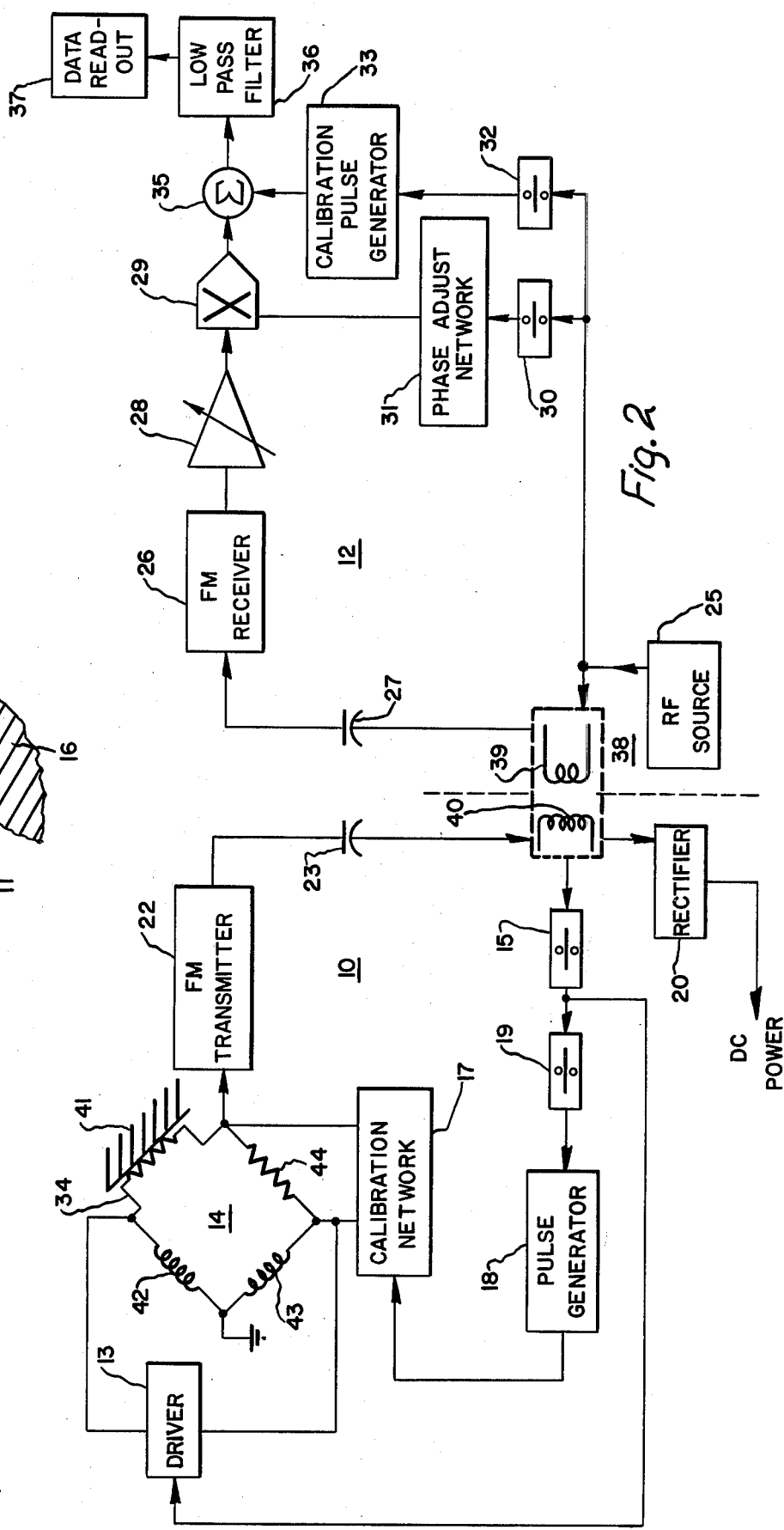
FIG. 2 is a block diagram of a preferred embodiment of the invention.

In FIG. 2, illustrating the circuitry of portions 10 and 12 in detail, the rotatable portion 10 comprises a bridge 14 and circuitry for its excitation including driver network 13 and first frequency divider network 15; networks for providing a calibration signal including calibration network 17, pulse generator 18, and second frequency divider network 19; a rectifier circuit 20 for supplying DC power as required by circuitry on the rotatable portion 10; and an FM transmitter 22 with transmitter coupling capacitor 23. The stationary portion 12 comprises a radio frequency (RF) power source 25; an FM receiver-demodulator network including FM receiver 26, receiver coupling capacitor 27, adjustable gain amplifier 28, and synchronous detector 29; a reference signal network including a third frequency divider 30, and phase adjust network 31; a network for providing a reference calibration pulse including a fourth frequency divider 32 and a calibration pulse generator 33; summing network 35; a low pass filter 36; and a data readout device 37. Rotary transformer 38 provides a coupling path for both a higher frequency FM carrier signal between transmitter 22 and receiver 26, and a lower frequency signal from the RF source 25 to provide operating power to the rotating circuitry.

Strain produced on a rotating member of the turbine is sensed by a strain gage 34 suitably bonded to the member 41 to be monitored. The gage 34 changes resistance from some nominal value in response to strain and is electrically connected as one element, or arm, of bridge circuit 14. Strain gage 34 is the active arm of bridge 14 while fixed resistor 44 and inductors 42 and 43 are the inactive arms. It should be noted, however, that bridge circuits may, and frequently do, have more than one active arm and that such strain gage transducer circuits are useful in the present invention. Also, it will be understood that all elements of the bridge circuit 14 may be resistive rather than including therein inductors as shown in this preferred embodiment.

The bridge circuit 14 derives its excitation voltage from the RF source 25 through the rotary transformer 38. The RF source 25 has sufficient power capacity to supply, in addition, all other power requirements of the rotating circuitry. The rotary transformer 38 consists of a stationary primary winding 39 and a rotating secondary winding 40 with inductive coupling therebetween. RF energy from the secondary winding 40 of transformer 38 is divided in frequency by first divider network 15 to give a lower subcarrier frequency, which, after receiving a power boost by driver circuit 13, provides the alternating current desired for excitation of bridge circuit 14. The RF energy from winding 40 is also applied to rectifier 20 providing direct current power for other networks of the rotating circuitry.

Alternating current (subcarrier) excitation of the bridge circuit 14 is an essential feature in achieving rejection of low frequency and synchronous noise. As strain occurs, a bridge output is produced consisting of the subcarrier excitation signal, amplitude modulated (AM) by the imposed strain signal. This modulation process—as is well known in the field of electronics engineering—produces a higher frequency, equal to the sum of the subcarrier excitation frequency and the imposed strain signal frequency. Mathematically, the output may be expressed as the product of the two signals, yielding both a sum and a difference of the two frequencies. The significant result is that the strain information is shifted to a higher frequency portion of the spectrum, away from lower frequency induced noise signals.

The amplitude modulated bridge output signal passes to an FM transmitter 22 providing a high-frequency carrier signal for transmittal of the information to the stationary portion 12 of the system. The carrier signal path from FM transmitter 22 is through transmitter coupling capacitor 23, across rotary transformer 38, through receiver coupling capacitor 27, to the FM receiver 26.

Ordinarily, alternating current excitation of a transducer bridge circuit would be useful only with direct wire interconnection between the transducer and detection/readout circuitry so that the excitation signal would be available to the detector for use as a reference signal. In the present invention the reference signal is provided at the stationary data collection and readout portion 12 by frequency division of the signal from the RF source 25 in a manner similar to that used in the rotating portion of the system to produce the subcarrier excitation signal for bridge circuit 14. The RF signal from source 25 is divided in frequency by third divider network 30 to produce an output reference signal equal in frequency to the subcarrier frequency. The reference signal is applied, through phase adjusting network 31, to a first input of synchronous detector 29 wherein the amplitude modulated subcarrier is demodulated to recover the desired strain signal. The synchronous detector 29 is a multiplication circuit so that its output represents, mathematically, the product of the amplitude modulated subcarrier and the reference signal. This produces frequencies equal to the sum and difference of the two input signals; the difference being the strain signal. Any lower frequency noise present with the amplitude modulated subcarrier, however, is shifted to a higher frequency portion of the spectrum. The synchronous detector 29 functions optimally when the phase of the reference signal corresponds precisely with the phase of the subcarrier signal. Phase adjust network 31 shifts the phase of the reference signal applied to the first input of synchronous detector 29 to achieve this optimum condition.

Self-calibration of the system is provided by periodically imposing the electrical equivalent of a known, fixed value of strain onto the bridge circuit 14 and transmitting this fixed value back to the stationary portion 12 of the system. Gain variations occurring in the transmitter 22 and other system components will modify the amplitude of the calibration signal but it will always correspond to a known value of strain. The calibration signal results from the operation of a calibration network 17 in conjunction with pulse generator 18 and second frequency divider network 19. The output signal from frequency divider 19 is a first lower frequency, derived from the subcarrier frequency, and supplies a timing frequency input to pulse generator 18 which, in turn, provides an output pulse to activate calibration network 17. Calibration network 17 responds by shunting one arm of bridge circuit 14 causing a momentary bridge unbalance condition which modulates the subcarrier signal as would an actual strain. The calibration signal thus imposed is automatically repeated periodically.

At the stationary portion 12, a reference calibration pulse of constant amplitude and identical in duty cycle, frequency, and phase to the transmitted calibration signal is provided by frequency division of the reference signal in a fourth divider network 32 and by applying the output thereof to calibration pulse generator 33 to produce a pulse having the desired qualities. The reference calibration pulse, having a negative polarity, is applied to one input of summing network 35. The summing network 35 also accepts the output from synchronous detector 29 and provides an output which is the sum of the synchronous detector output signal and the reference calibration pulse. The transmitted calibration signal, contained in the output signal from the synchronous detector 29 and representing a known value of strain, will be nulled, or cancelled, from the signal by the reference calibration pulse in summing network 35, provided the absolute magnitudes of the transmitted calibration signal and the reference calibration pulse are equal. Adjustable gain amplifier 28 provides a means to vary the amplitude of the received signal so that nulling can be achieved, leaving as the output of summing network 35 only the strain signal produced on the turbine rotor. The adjustable gain amplifier 28 thus returns the system to a standard, calibrated gain condition. Unwanted gain changes are immediately flagged by the loss of a nulled condition, and calibration may be restored by adjustable gain amplifier 28. A significant ancillary benefit of a nulled condition is that the polarity of the output signal from summing network 35 indicates whether the turbine rotor member is being compressively or tensively strained.

A low pass filter network 36 at the output of summing network 35 severely attenuates all signals above a selected cutoff frequency (for example, above 2000 Hz.) prior to passing the strain signal to readout device 37. Interfering noise signals, shifted to a higher frequency portion of the spectrum by the demodulation process of synchronous detector 29 are removed. The data readout device 37 is a data logging and indicating means to present operating personnel with an immediate indication and a permanent record of rotor strain.

Figure 3:
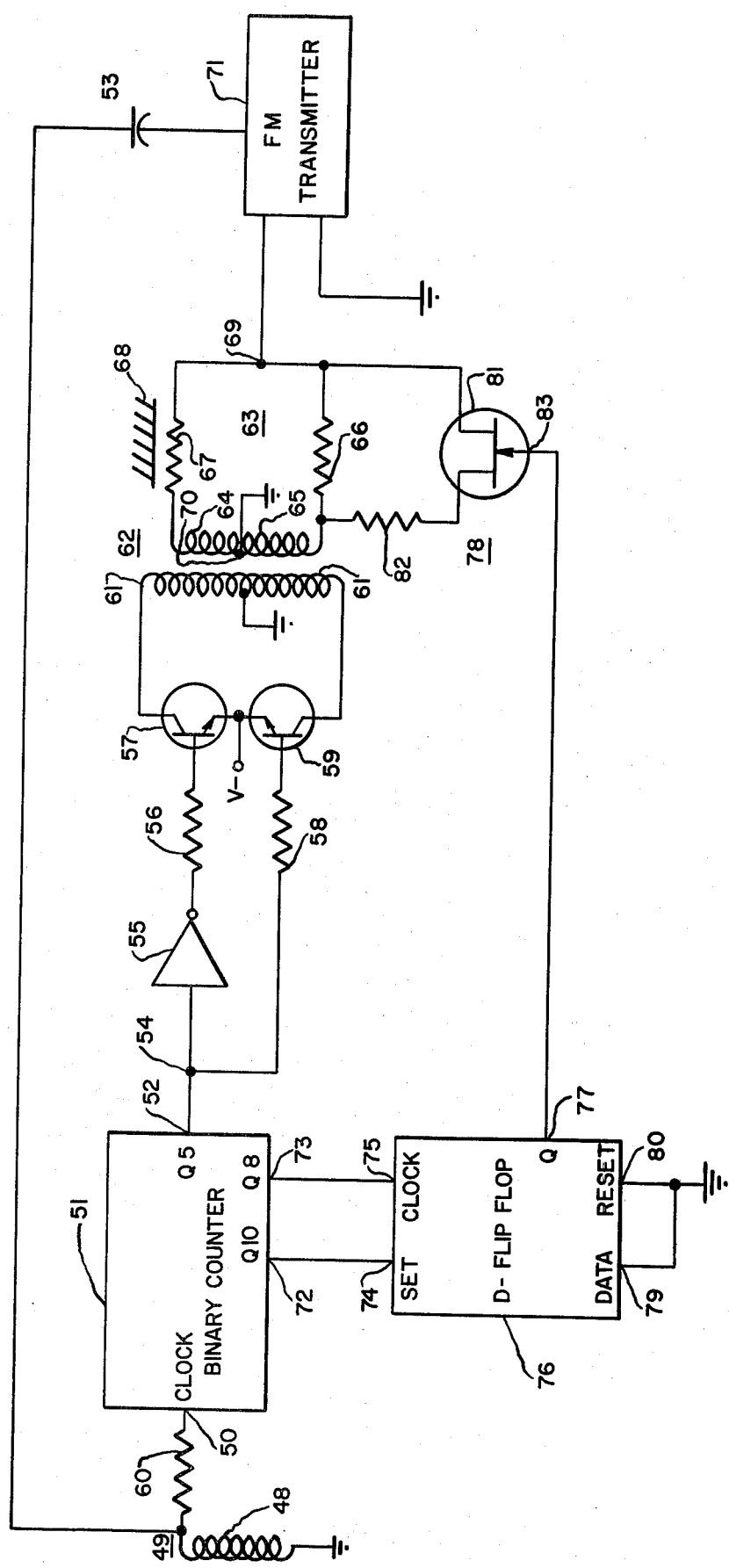
FIG. 3 is a schematic diagram of the rotatable transducer-data transmission portion of the system as shown in the block diagram of FIG. 2.
Figure 4:
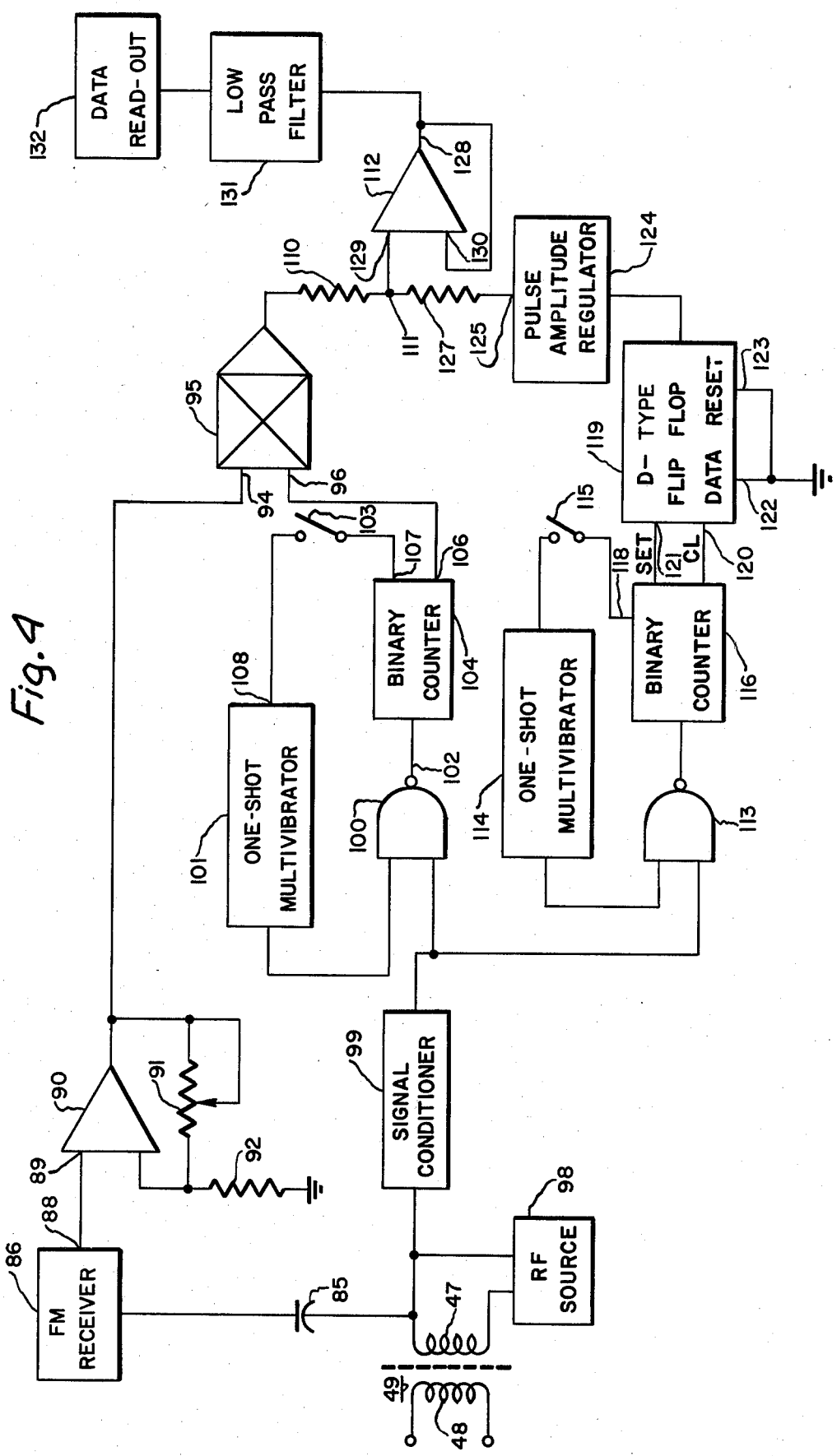
FIG. 4 is a schematic diagram of the stationary data reception-readout portion of the system as shown in the block diagram of FIG. 2.

FIGS. 3 and 4 illustrate in detail, circuitry by which the preferred embodiment of FIG. 2 may be implemented. FIG. 3 shows the transducer-data transmission portion of the system rotatable with the turbine element to be monitored, and FIG. 4 shows the stationary data reception-readout portion. Circuit details reflect the availability of integrated circuitry, and accordingly, blocks shown in the Figures represent standard, commercially available components, or circuits well known to those skilled in the art.

In FIG. 3, induced RF energy from the secondary winding 48 of rotary transformer 49 is connected to the clock input 50 of binary counter 51 through limiting resistor 60. The frequency of the RF signal may, for example, be on the order of 300 KHz. Binary counter 51 divides the frequency of the input signal by a power of two to supply an output subcarrier signal of lower frequency. The subcarrier signal appears at output terminal 52 having a frequency, for example, of about 9000 Hz. (equal, in this example, to the input frequency divided by $2^5$).

The subcarrier signal from binary counter 51 is split into two paths at junction 54; passing by one path through inverter 55 and current limiting resistor 56 to the base of transistor 57; and by the second path through current limiting resistor 58 to the base of transistor 59. Thus, applied to the bases of transistors 57 and 59 are two phases of the subcarrier signal, differing by 180°. Transistors 57 and 59, operated push-pull, provide a power boost to the subcarrier signal before it is applied to the primary winding 61 of transformer 62. Transistors 57 and 59 with primary winding 61 comprise a driver circuit. The emitter connections of transistors 57 and 59 are connected to a regulated negative voltage source (not shown). It will be understood that all circuits herein described are provided with DC voltage as necessary for operating power, although the voltage sources may be omitted from the drawings.

The subcarrier signal excites bridge circuit 63 comprising secondary windings 64 and 65 of transformer 62, fixed resistor 66 and strain gage 67. The strain gage 67 is bonded by suitable means to the rotating turbine member 68 in which strain is to be measured and is the active arm of bridge circuit 63. As is characteristic of bridge circuits, the output signal voltage from bridge circuit 63 depends upon the condition of bridge balance. A balance exists when the impedance to current flow of arms, or elements, of bridge circuit 63 (comprising, in this case, windings 64 and 65, resistor 66, and gage 67) bear selected ratios to each other. As strain occurs in turbine member 68, a change in the relative balance of bridge 63 produces a corresponding output signal. The output of bridge circuit 63 appears as a voltage signal between junction 69 and the grounded junction 70 interconnecting windings 64 and 65. The output is a signal at the subcarrier frequency, amplitude modulated by the imposed strain sensed by gage 67, and is applied to the input of FM transmitter 71.

FM transmitter 71 provides a high-frequency carrier signal, frequency modulated by the bridge output signal. The FM carrier signal, containing the measured strain data, passes through a coupling capacitor 53, rotary transformer 49 and then to the stationary portion of the system. Transmitter 71 may, for example, be of the type manufactured and sold by the Acurex Corp. as Model 255 for use in the carrier frequency range of 88 to 108 MHz.

The frequency dividing function of binary counter 51 is also utilized in providing signals lower in frequency than the subcarrier frequency. These lower frequency signals, representing divisions of the RF signal by powers of two that are higher than those used in obtaining the subcarrier signal, appear an output terminals 72 and 73 of binary counter 51 with the frequency of the signal at terminal 73 being four times that of the signal at terminal 72. Output terminals 72 and 73 are connected, respectively, to the SET input 74 and the CLOCK input 75 of positive edge triggered D-type flip-flop 76 which is a pulse generator to provide an asymmetrical rectangular wave output signal at the Q output terminal 77.

The DATA terminal 79 and RESET terminal 80 of flip-flop 76 are connected together and to circuit ground.

The rectangular wave from Q terminal 77 is applied to a calibration network 78 consisting of field-effect transistor 81 and series resistor 82, which in turn are parallel connected with resistor 66 forming one arm of bridge circuit 63. Field-effect transistor 81 is a switching device, being either open or closed as controlled by the rectangular wave signal applied to its gate terminal 83. Whenever the rectangular wave is at a high level, field-effect transistor 81 is in a conducting state (switch closed) and resistor 82 shunts bridge resistor 66 causing an unbalanced condition of bridge 63; when the rectangular wave is at a low level the field-effect transistor is nonconducting (switch open) leaving the relative balance of the bridge 63 undisturbed. Thus the bridge circuit 63 is periodically unbalanced by an amount equivalent to a known value of strain to provide a calibration signal that amplitude modulates the subcarrier excitation signal as does strain sensed by strain gage 67.

In FIG. 4 the FM modulated carrier signal, containing the measured strain data, passes through the rotary transformer 49 to primary winding 47, through coupling capacitor 85 to FM receiver 86. The FM receiver 86 demodulates the FM carrier signal to recover the amplitude modulated (AM) subcarrier signal. The AM subcarrier signal appears at the output terminal 88 of the FM receiver 86 and is applied to the input 89 of amplifier 90 which has a feedback network including adjustable resistor 91 and fixed resistor 92 to allow the gain of amplifier 90 to be adjusted. The output signal of amplifier 90 is applied to an input terminal 94 of synchronous detector 95.

The synchronous detector 95 provides amplitude demodulation and is an analog multiplying device, multiplying the signal at terminal 94 by a reference signal at terminal 96. The reference signal is derived from the RF source 98 which also supplies RF energy to the primary winding 47 of rotary transformer 49 to provide operating power for the rotatable transducer-data transmission portion of the system. For the reference signal, the RF signal is first passed through a signal conditioner, well known to those skilled in the art, to convert the RF signal, which is substantially a sine wave, to a square wave compatible with digital logic circuits. The square wave is connected to one input of NAND gate 100 which has a second input connected to the one-shot multivibrator 101. NAND gate 100 is a logic circuit, inverting and passing the square wave from the signal conditioner 99 to output terminal 102 whenever the one-shot multivibrator 101 signal is at a high logic level. The multivibrator 101 provides a high logic level except when switch 103 is closed. Thus with switch 103 open, the square wave signal, of frequency equal to the frequency of the RF source, is applied to the input of binary counter 104.

Binary counter 104 divides the input signal frequency to provide, at terminal 106, the reference signal, of frequency equal to the subcarrier frequency, required by synchronous detector 95. The synchronous detector 95 optimally demodulates the AM signal, applied to terminal 94, when the reference and AM signals are of precisely the same phase. The desired phase relationship is achieved by connecting output terminal 107 of binary counter 104 through switch 103 to the input terminal 108 of one-shot multivibrator 101, causing one-shot multivibrator 101 to produce a string of uniform pulses while switch 103 is held closed. The uniform pulses are applied as the second input to NAND gate 100 so that when the output signal of multivibrator 101 is low, the output of NAND gate 100 is forced low regardless of the level of input signal from signal conditioner 99. Thus, while switch 103 is closed there is a periodic removal of pulses from the square wave signal applied to the input of binary counter 104. Correspondingly, the reference signal output of binary counter 104 is shifted in phase as desired. Switch 103 is held closed only long enough to achieve the proper phasing as determined by the demodulation performance of synchronous detector 95. The demodulated output of synchronous detector 95 yields the measured strain and calibration signals which are then passed through scaling resistor 110 to the summing node 111 of buffer amplifier 112.

The square wave signal from signal conditioner 99 is also applied to one input of NAND gate 113 which has a second input connected to one-shot multivibrator 114. Multivibrator 114 and switch 115 comprise a phase adjust network to adjust the phase of the output signals from binary counter 116 as was described above for adjusting the phase of the reference signal produced by binary counter 104. Switch 115 is momentarily closed until the desired phasing is achieved by the application of an output signal from terminal 118 of binary counter 116 to the input of multivibrator 114. Binary counter 116 is a frequency reducing circuit, dividing the input signal by a power of two to produce output signals lower in frequency than the reference frequency produced by binary counter 104.

A D-type flip-flop circuit 119 has applied to CLOCK input 120 and SET input 121, signals differing in frequency by a factor of four and taken from binary counter 116. With DATA terminal 122 and RESET terminal 123 connected together and to circuit ground, flip-flop 119 is a pulse shaping network producing an asymmetrical rectangular wave signal having the same duty cycle (but of opposite polarity) as the rectangular wave produced by D-type flip-flop 76 of the transducer-data transmission portion of the system shown in FIG. 3. The output of D flip-flop 119 is applied to a pulse amplitude regulator 124 which maintains a constant amplitude on the rectangular wave signal, producing a stable reference calibration pulse at output terminal 125. NAND gate 113, binary counter 116, one-shot multivibrator 114, switch 115, D flip-flop 119, and pulse amplitude regulator 124 comprise a frequency divider-calibration pulse generator. The reference calibration pulse passes through scaling resistor 127 to the summing node 111.

Scaling resistors 110 and 127, summing node 111, and buffer amplifier 112 comprise a summing network which produces at output terminal 128 the sum of the signals applied through scaling resistors 110 and 127. Amplifier 112 has an input terminal 129 connected to summing node 111 and an input terminal 130 adapted to receive a feedback signal from output terminal 128 to provide stable operation. The summed signal from amplifier 112 is passed through a low pass filter 131 which attenuates all signals of frequency above a selected cutoff frequency and passes, without substantial attenuation, those signals of lower frequency. For example, filter 131 may be a four-pole Butterworth filter having an upper frequency limit of 2 KHz. A data readout device 132 is connected to the output of filter 131 to provide a visual indication and, if desired, a permanent record of the strain produced on the turbine rotor element being monitored. The readout device 132 may, for example, be an oscilloscope or a magnetic tape recorder.

Operation

In use to monitor the strain on rotating members of a turbine, operation of the telemetry system is as follows.

An RF source 98 provides a high-frequency signal which is coupled from the stationary portion of the system to the rotatable portion by rotary transformer 49. The RF signal is rectified to provide DC voltage and is also passed to a binary counter 51 where the frequency is reduced to produce a lower frequency, subcarrier signal. The subcarrier signal is given a power boost in a driver network comprised of inverter 55, resistors 56 and 58, transistors 57 and 59, and primary winding 61 of toroidal transformer 62. The power boosted subcarrier signal excites bridge circit 63 having strain gage 67 as an active sensing arm. As strain occurs in turbine member 68, unbalance condition is produced in bridge circuit 63. The unbalance causes amplitude modulation of the subcarrier excitation by the sensed strain signal. The modulation process shifts the strain signal to a higher frequency portion of the spectrum, away from lower frequency, unwanted noise signals.

Binary counter 51 also provides two lower frequency output signals (lower than the subcarrier frequency), applied as inputs to a D-type flip-flop circuit 76. The flip-flop 76 is configured as a wave shaper, producing an asymmetrical rectangular wave output signal used to turn on and off field-effect transistor 81 as a switching means to shunt bridge resistor 66 with resistor 82. The shunting occurs at a periodic rate and creates momentary unbalances in bridge circuit 63. The magnitude of unbalance is known, repeatable, and simulates a fixed value of strain to provide a calibration signal. The calibration signal amplitude modulates the subcarrier excitation signal as does actual strain.

The bridge output signal, consisting of the subcarrier signal modulated by actual strain and the calibration signal, is passed to FM transmitter 71 providing a high-frequency carrier to convey the composite signal to the stationary portion of the system through coupling capacitor 53 and rotary transformer 49.

The FM carrier signal, on the stationary portion of the system, passes through coupling capacitor 85 to FM receiver 86. Receiver 86 demodulates the FM signal, recovering the amplitude modulated bridge output signal which is passed through adjustable gain amplifier 90 to one input of synchronous detector 95. Synchronous detector 95 is an amplitude demodulator circuit to recover the measured strain and calibration signals. Synchronous detector 95 is a multiplying device and in the demodulation process shifts the strain signal back to its original, lower frequency part of the spectrum and shifts any transmitted low-frequency noise to a higher frequency part of the spectrum. A reference signal is required for demodulation.

The reference signal is obtained by taking the RF signal through signal conditioner 99 to produce a square wave digital signal for application to NAND gate 100 and binary counter 104. Binary counter 104 reduces the frequency of the input signal so that the reference signal frequency is equal to the subcarrier frequency. One-shot multivibrator 101 in conjunction with NAND gate 100 and switch 103 provide means for shifting the phase of the reference signal, insuring a proper phase relationship between the reference signal and the amplitude modulated subcarrier signal as inputs to synchronous detector 95. The demodulated output of synchronous detector 95, representing only the measured strain and the calibration signal is applied as one input to a summing network comprising resistors 110 and 127, node 111, and amplifier 112.

The second input to the summing network is a reference calibration pulse obtained by taking the output of signal conditioner 99 through binary counter 116 to obtain a frequency division and a signal equal in frequency to the calibration signal. One-shot multivibrator 114 with NAND gate 113 and switch 115 provide means to shift the phase of the lower frequency signal thus obtained. D-type flip-flop 119 produces a pulse having a time duration equal to that of the calibration signal. The pulse amplitude regulator 124 controls the reference calibration pulse so that a pulse of constant amplitude is applied as the second input to the summing network.

The output of the summing network is equal to the sum of the two inputs. The gain of amplifier 90 is adjusted by resistor 91 so that the transmitted calibration signal is nulled out in the summing network by the reference calibration pulse and the output at terminal 128 is a signal representing only the measured strain and high-frequency noise signals. The noise is removed by low pass filter 131 and the strain signal is displayed on data readout device 132. Data readout device 132 is utilized also in achieving the desired phase relationship between the reference signal and the transmitted amplitude modulated signal applied to synchronous detector 95, and between the calibration signal and the reference calibration pulse. The data readout device 132 is observed as either of switches 103 or 115 are held closed long enough to optimize the signal displayed by readout device 132.

While there has been shown and described a preferred embodiment of the invention, and there has been set forth the best mode contemplated of carrying out the invention, it is understood that various other modifications may be made therein. For example, although a manual means is shown and described for adjusting the gain to achieve a null condition, a feedback control loop may be incorporated to automatically perform this function. Also, it should be understood that although circuit elements of a particular kind are described, other kinds of circuit elements to perform the same or similar functions may be appropriate. It is intended to claim all such modifications which fall within the true spirit and scope of the present invention.

What is claimed is:

1. In combination with apparatus having a stationary member, and a heavy rotational member or rotor adapted to rotate at high speed within said stationary member, a telemetry system for detecting strain on a part of said rotational member comprising:
    (a) a transducer-data transmission portion mounted on and rotatable with said rotational member;
    (b) a stationary data reception-readout portion having means for generating a radio frequency (RF) signal, said RF signal being supplied to said transducer-data transmission portion and to said data reception-readout portion;
    (c) means for inductively coupling signals between said transducer-data transmission portion and said data reception-readout portion;
    (d) said transducer-data transmission portion including (d1) a first means for frequency division of said RF signal to provide a lower frequency subcarrier signal;

(d2) a strain gage transducer adapted for excitation by said subcarrier signal and responsive to strain on said rotational member by producing a corresponding amplitude modulated signal at the subcarrier frequency;

(d3) an FM transmitter for receiving said amplitude modulated signal and generating a carrier signal for transmission through said inductive coupling means to said stationary data reception-readout portion, said carrier signal being frequency modulated by said amplitude modulated signal; and (e) said data reception-readout portion including (e1) a second means for frequency division of said RF signal to provide a reference signal equal in frequency to said subcarrier signal;

(e2) an FM receiver for receiving and demodulating said carrier signal to yield said amplitude modulated signal; and, (e3) a synchronous detector having a first input for receiving said reference signal and a second input for receiving said amplitude modulated signal from said FM receiver, said synchronous detector producing a demodulated signal representative of strain on said rotational member.

2. The combination of claim 1 wherein, (a) said transducer-data transmission portion further includes (a1) means for frequency division of said subcarrier signal to provide a first lower frequency signal;

(a2) a pulse generator adapted to receive said first lower frequency signal and produce in response thereto an output pulse signal of equal frequency;

(a3) a calibration network having an input terminal for receiving said pulse signal and adapted to introduce a calibration signal of fixed time duration and of magnitude equal to a known value of strain into said strain gage transducer in response to said pulse signal; and, (b) said stationary portion further includes (b1) a third means for frequency division of said RF signal to provide a second lower frequency signal, said first and said second lower frequencies being equal;

(b2) a reference calibration pulse generator adapted to receive said second lower frequency signal and produce in response thereto a reference calibration pulse of equal frequency having a fixed amplitude and a time duration equal to the time duration of said calibration signal;

(b3) a summing network having a first input for receiving the demodulated signal of said synchronous detector and a second input for receiving said reference calibration pulse, said summing network adapted to produce an output signal equal to the sum of signals applied to said first and second inputs; and, (b4) an amplifier interposed between said FM receiver output and said second input of said synchronous detector, said amplifier having a gain control means effective to produce a null between said calibration signal and said reference calibration pulse at the output of said summing network for calibration of said telemetry system.

3. The combination of claim 2 wherein said data reception-readout portion further includes,
a phase adjust network operable to shift the phase of said reference signal applied to said first input of said synchronous detector.

4. The combination of claim 3 wherein said data reception-readout portion further includes,
a filter network having an upper cutoff frequency and adapted to receive the output signal of said summing network and pass those signals of frequency less than said upper cutoff frequency while substantially attenuating those signals of higher frequency.

5. The combination of claim 4 wherein said means for inductively coupling signals between said transducer-data transmission portion and said data reception-readout portion comprises a transformer having a primary winding and a secondary winding one of which is rotatable with respect to the other.

6. The combination of claim 4 wherein said strain gage transducer comprises a bridge circuit having at least one strain gage active arm.

7. The combination of claim 6 wherein said calibration network comprises:
a switching means connected in parallel with an arm of said bridge circuit, said switching means operable from an open to a closed position in response to said pulse signal to cause a fixed magnitude of bridge unbalance.

8. The combination of claim 6 wherein,
said first means for frequency division of said RF signal to provide a subcarrier signal and said means for frequency division of said subcarrier signal to provide a first lower frequency comprise a first binary counter;

said pulse generator comprises a first D flip-flop circuit;

said calibration network comprises a field-effect transistor and a series resistor connected in parallel with one arm of said bridge circuit, said field-effect transistor being switchable from a nonconducting to a conducting state in response to said pulse signal;

said second means for frequency division of said RF signal to provide a reference signal comprises a second binary counter;

said synchronous detector comprises an analog multiplier;

said third means for frequency division of said RF signal to provide a second lower frequency comprises a third binary counter;

said reference calibration pulse generator comprises a second D flip-flop and a pulse amplitude regulator;

said summing network comprises first and second scaling resistors, a summing node, and a buffer amplifier;

said phase adjust network comprises a switch, a one-shot multivibrator, and a NAND gate operatively connected with said second binary counter to shift the phase of said reference signal; and, said filter network comprises a low-pass four-pole Butterworth filter.

* * * * *